No. 773,763. PATENTED NOV. 1, 1904.
J. F. McCORMICK.
CARPENTER'S GAGE FOR DRAFTING RAFTERS AND BRACES.
APPLICATION FILED MAR. 9, 1904.
NO MODEL. 2 SHEETS—SHEET 2.
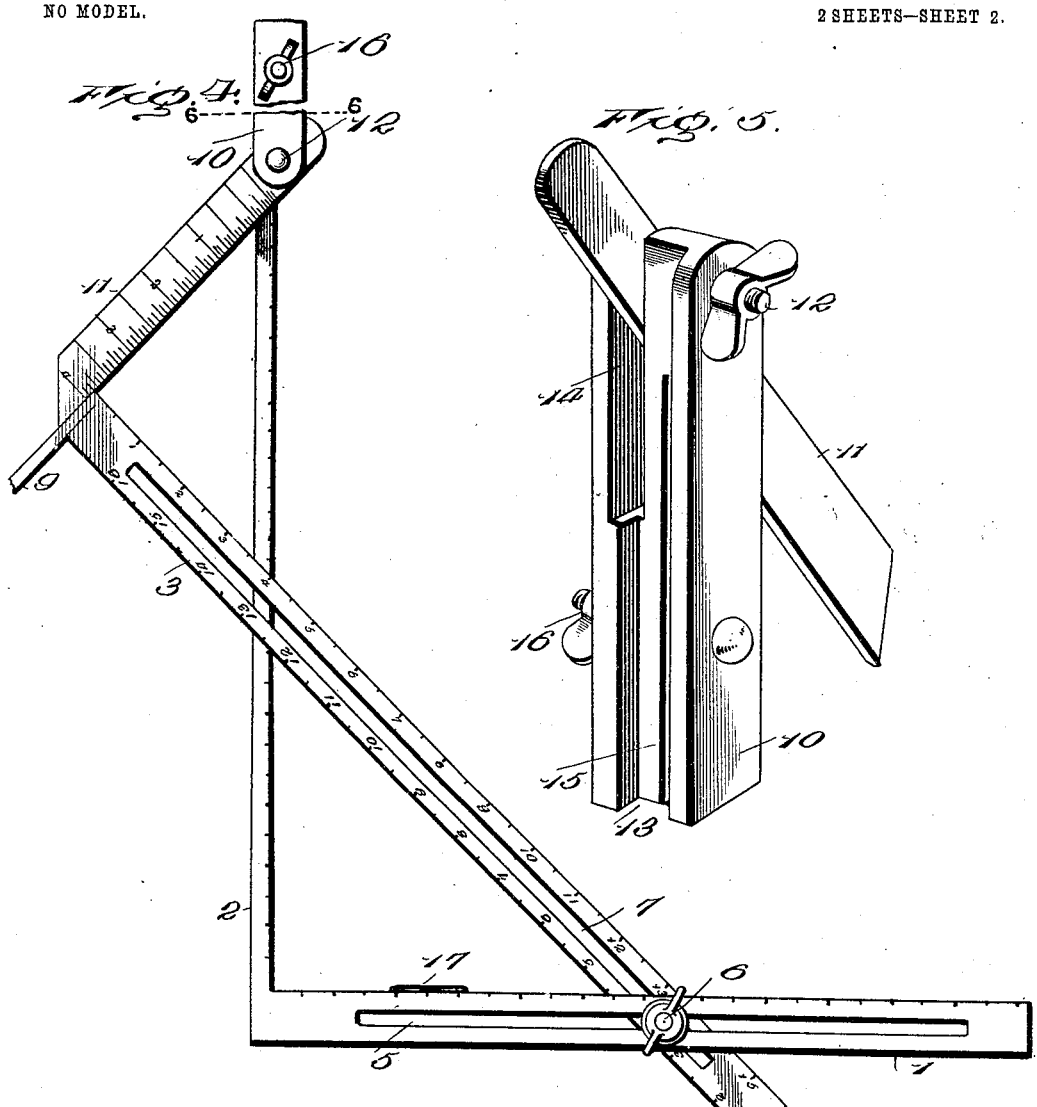
Witnesses
Inventor
John F. McCormick.
By
R. S. & A. B. Lacey, Attorneys.

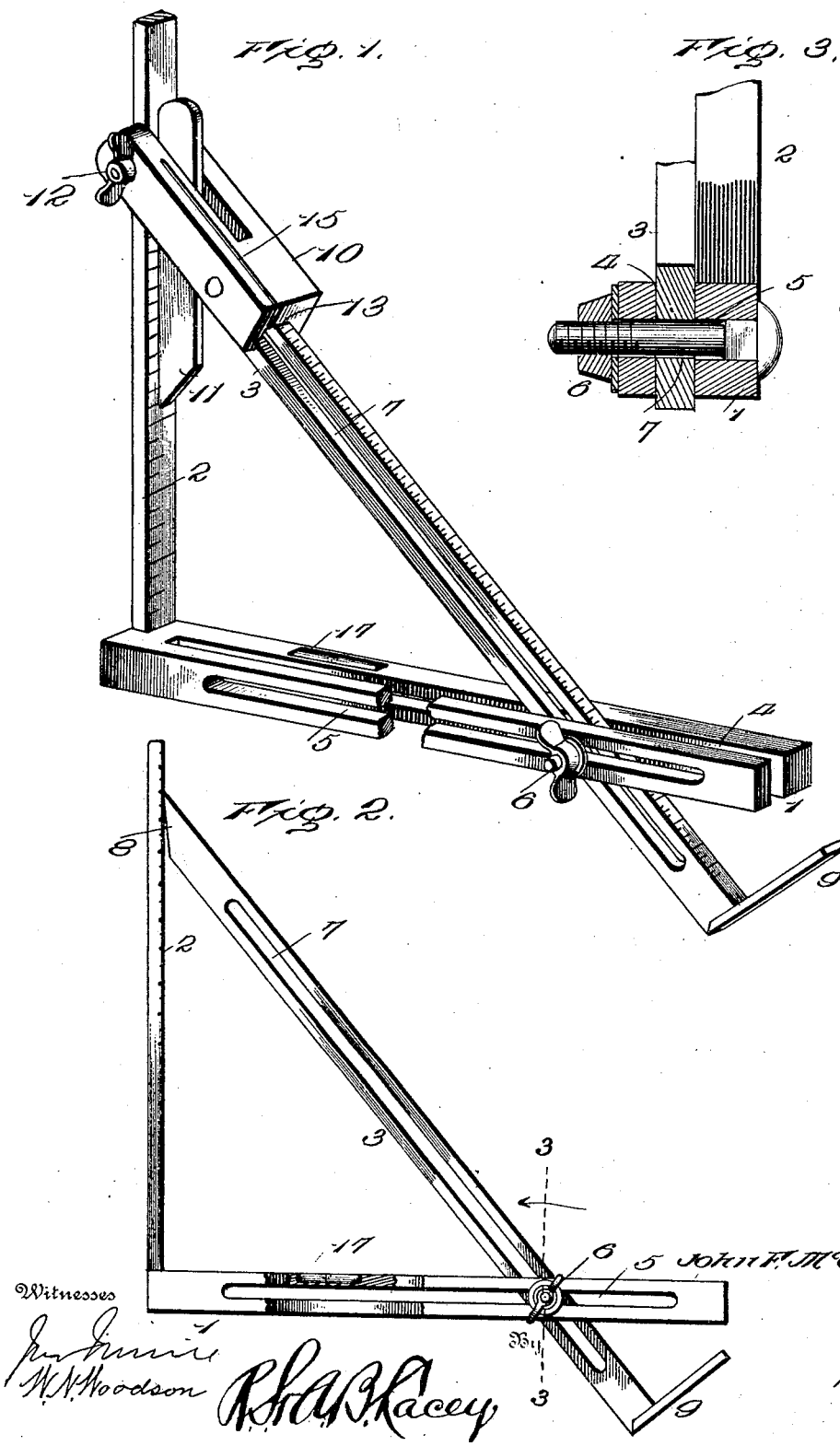

No. 773,763. Patented November 1, 1904.

UNITED STATES PATENT OFFICE.

JOHN F. McCORMICK, OF CHURUBUSCO, INDIANA.

CARPENTER'S GAGE FOR DRAFTING RAFTERS AND BRACES.

SPECIFICATION forming part of Letters Patent No. 773,763, dated November 1, 1904.

Application filed March 9, 1904. Serial No. 197,310. (No model.)

*To all whom it may concern:*

Be it known that I, JOHN F. McCORMICK, a citizen of the United States, residing at Churubusco, in the county of Whitley and State of Indiana, have invented certain new and useful Improvements in Carpenters' Gages for Drafting Rafters and Braces, of which the following is a specification.

This invention provides a square for artificers to enable work to be accurately and quickly laid off, being especially adapted for carpenters and builders to facilitate the ascertainment of the length of rafters, braces, slant purlin-posts and braces, and the angles at the ends of said parts and the location of mortises in beams, purlin-posts, and the like to receive the tenoned ends of the braces, struts, and other parts in special work.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the square, showing the application of determining the length of a rafter and the angle at the upper or head end. Fig. 2 is a side view of the square as it appears when adjusted for determining the length of a rafter, brace, or like part and the angle at the head and heel ends thereof. Fig. 3 is a transverse section on the line 3 3 of Fig. 2 looking in the direction of the arrow, parts being broken away. Fig. 4 is a side elevation showing the arrangement of the parts when laying off special work, such as determining the length and angles of a slant purlin-brace. Fig. 5 is a perspective view of the bevel-square. Fig. 6 is a section on the line 6 6 of Fig. 4.

Corresponding and like parts are referred to in the following description and indicated in all the views of the drawings by the same reference characters.

The instrument comprises two parts, a square and a bevel-square. The square comprises the base member 1, arm 2, and straight-edge 3. The arm 2 and base member 1 are disposed at a right angle to each other, whereas the straight-edge 3 is adjustable with reference thereto and in conjunction therewith serves to indicate the length of braces or diagonals and the angles at opposite ends thereof. The several parts of the square proper and the bevel-square are graduated as may be desired according to the special work for which the instrument may be designed. For general application the graduations are laid off in inches and fractional parts thereof, the inches corresponding to feet and the subdivisions of the inches to the units of a foot. To meet this requirement, the inches are subdivided into twelfths, each twelfth representing an inch or unit of a foot when laying off work. The several parts are similarly graduated, so as to secure a correspondence of indication when laying off work, thereby obviating confusion or necessitating allowances. The base member 1 generally corresponds to the beam or horizontal work and the arm 2 to the rise or altitude of the work. The straight-edge 3 represents the brace or diagonal and the indicated distance designated thereon at its points of touching or crossing the parts 1 and 2 corresponds in feet and inches to the length of the brace, rafter, or other part, and the angle between the upper end of the straight-edge and the arm 2 will give the cut or angle at the head end of the work and the angle between the straight-edge and the member 1 will give the angle at the heel or lower end of the work, said angle being readily determined by the bevel-square, as indicated most clearly in Fig. 1. The base member 1 is provided with longitudinal slots 4 and 5, which have a right-angular arrangement and intersect, the longitudinal slot 4 being in the plane of the arm 2 and the longitudinal slot 5 being in a plane at a right angle to the plane of the arm 2. The straight-edge 3 is adapted to move freely in the longitudinal slot 4 and is held in the required adjusted position by means of the clamp-bolt 6, which passes through the slot 5 and a corresponding longitudinal slot 7 in the straight-edge.

The slot 5 is closed at its ends, thereby preventing displacement of the clamp-bolt, and for a like reason the slot 7 is closed at its ends. The slot 4 is open at its outer end to admit of moving the straight-edge from one side to the other of the base member 1, according to the nature of the work to be laid out. One end of the straight-edge is inclined or cut off at an angle, as shown at 8, thereby admitting of the point coming close against the graduated side of the arm 2, which is essential to accuracy. The opposite end of the straight-edge is square and is preferably provided with a projection 9, which is at a true right angle to the straight-edge and provides sufficient surface to enable the blade of the bevel-square to be properly placed when it is desired to use the square end of the straight-edge, as indicated in Fig. 4.

The bevel-square comprises the stock 10 and the blade 11, the latter being pivoted to the stock and adapted to be secured in an adjusted position by the clamp-bolt 12. The outer side of the stock 10 is channeled or grooved to provide a longitudinal seat 13 of a width to snugly receive the arm 2 when the bevel-square is fitted thereto. An end portion of one wall of the seat 13 is cut away, as indicated at 14, to receive the blade 11 and admit of the latter lying adjacent to and wholly at one side of the seat 13. A kerf 15 extends into the stock from one end and separates the same, so as to provide, in effect, movable members, which are adapted to be drawn together by means of a clamp-bolt 16, so as to secure the bevel-square to the arm 2 in the required position, as indicated in Figs. 1, 4, and 6. This construction enables the bevel-square to be positively secured to the arm 2 at the required point, thereby enabling the straight-edge to be manipulated and adjusted without fear of displacement of the bevel-square.

When the rise and width of work is given and it is required to ascertain the length of the diagonal and the angles between said diagonal and the vertical and the horizontal, the straight-edge 3 is moved so that its upper end points to a figure on the arm 2 corresponding to the rise and its lower end adjusted so as to cross the base member 1 at a point corresponding to the width, after which the straight-edge is made secure by tightening the clamp-bolt 6. The number indicated on the straight-edge at its point of crossing the base member 1 corresponds to the length of the diagonal, and the angles between said straight-edge and the parts 1 and 2 correspond to the angles at the ends of the diagonal in order to assure a close fit with the beam and post, as will be readily comprehended. These angles are readily ascertained, by means of the bevel-square, in the manner well understood.

In order to increase the utility of the instrument, the base member 1 is provided at a convenient point with a spirit-level 17, whereby work may be leveled and plumbed.

Having thus described the invention, what is claimed as new is—

1. In combination, a square comprising a base member and an arm, a straight-edge adjustable with reference to the arm and base member, means for securing the straight-edge in the adjusted position and a bevel-square comprising a stock and pivoted blade, said stock having a longitudinal split or kerf and a seat to receive the aforesaid arm, and means for drawing the separated parts of the stock together to clamp the stock upon the arm at the required position, substantially as set forth.

2. In combination with a square comprising a base member and a right-angularly-disposed arm, an adjustable straight-edge, means for securing the straight-edge in an adjusted position and a bevel-square comprising a stock and a pivoted blade, said stock having a longitudinal seat in one face to receive the aforementioned arm and having a kerf or split, and means for drawing the separated parts of the stock together to clamp the same upon the arm, substantially as set forth.

In testimony whereof I affix my signature in presence of two witnesses.

JOHN F. McCORMICK. [L. S.]

Witnesses:
EDWARD E. FLANAGAN,
ALEXANDER B. CRAIG.